Dec. 2, 1941.  J. R. HARTLEY  2,265,114
PRESSURE TRANSMITTING RELAY UNIT
Filed Oct. 8, 1938  2 Sheets-Sheet 1

JOHN R. HARTLEY
INVENTOR

ATTORNEY

Dec. 2, 1941.  J. R. HARTLEY  2,265,114
PRESSURE TRANSMITTING RELAY UNIT
Filed Oct. 8, 1938  2 Sheets-Sheet 2
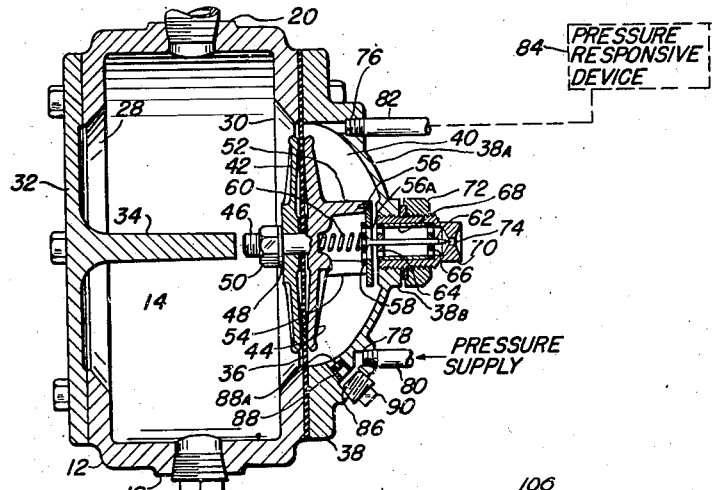
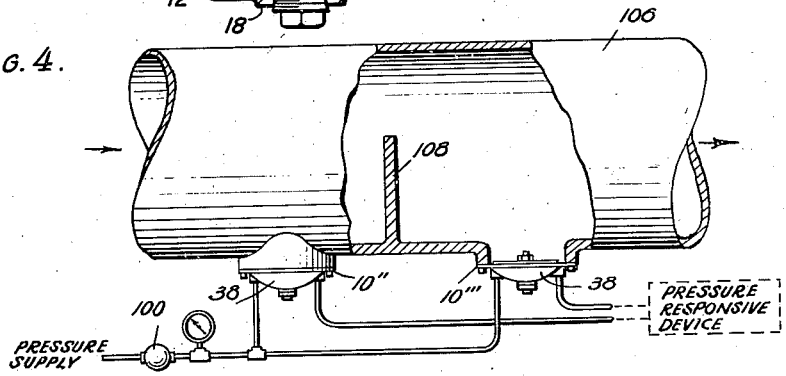
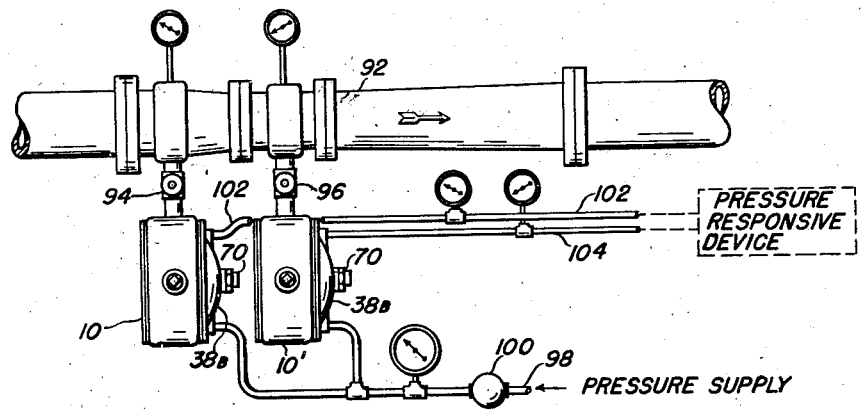
JOHN R. HARTLEY
INVENTOR
ATTORNEY Patented Dec. 2, 1941

2,265,114

UNITED STATES PATENT OFFICE 2,265,114

PRESSURE TRANSMITTING RELAY UNIT

John R. Hartley, Barrington, R. I., assignor to Builders Iron Foundry, Providence, R. I., a corporation of Rhode Island Application October 8, 1938, Serial No. 234,073

1 Claim. (Cl. 137—153)

This invention relates to improvements in pressure transmitting relay units.

A principal object of this invention is to provide a relay unit for the transmission to a remote location of the pressure of one fluid by another fluid in a manner such that the transmitted pressure will vary promptly and correspondingly with the controlling pressure. Such a unit is particularly applicable where the fluid whose pressure is the controlling one is at such a pressure that it is not feasible to utilize the fluid itself for transmitting its pressure. For example, the fluid may be a liquid in a container or conduit under a relatively low head, in which case the head available would limit the vertical distance to which the pressure corresponding to the head could be transmitted. Or the fluid might be a gas or liquid of such a nature, a highly inflammable fluid or a highly corrosive or toxic one for instance, which should preferably not be removed from its container. By using the present invention the pressure of the controlling fluid may be employed to control the pressure of the transmitting fluid in such relation thereto that the transmitted pressure may be safely used at some distant point to indicate or record the controlling pressure or may be used as the actuating medium for effecting the operation of pressure-responsive apparatus.

The improved unit I have devised is for the transmission of a single pressure. It is a feature of the unit that it may be provided with a casing having a chamber which may be connected by a pipe to a container, or the unit may be constructed so as to be applied to a container itself with no intermediate connection, and be easily removable. Where it is desired to transmit different pressures occasioned by the flow of a fluid, as through a Venturi tube or past a baffle plate, two such relay units should be employed, one for each pressure determined by the conditions of flow. By thus providing for the transmission of two different pressures to some remote device the action of the latter is more alertly sensitive than if the differential of the two controlling pressures is alone utilized for transmission.

The best modes in which I have contemplated applying the principles of my invention are shown in the accompanying drawings but these are merely illustrative for it is intended that the patent shall cover by suitable expression in the appended claim whatever feature of patentable novelty exist in the invention disclosed.

In the accompanying drawings:

Figure 2 is a plan in section taken on line 2—2 of Figure 1;

Figure 3 is a plan showing the application of my invention to a system where the controlling pressures result from a fluid flowing through a conduit;

Figure 4 is a plan, partly in section, showing another application of the invention to a conduit in which fluid is flowing.

Figure 1:
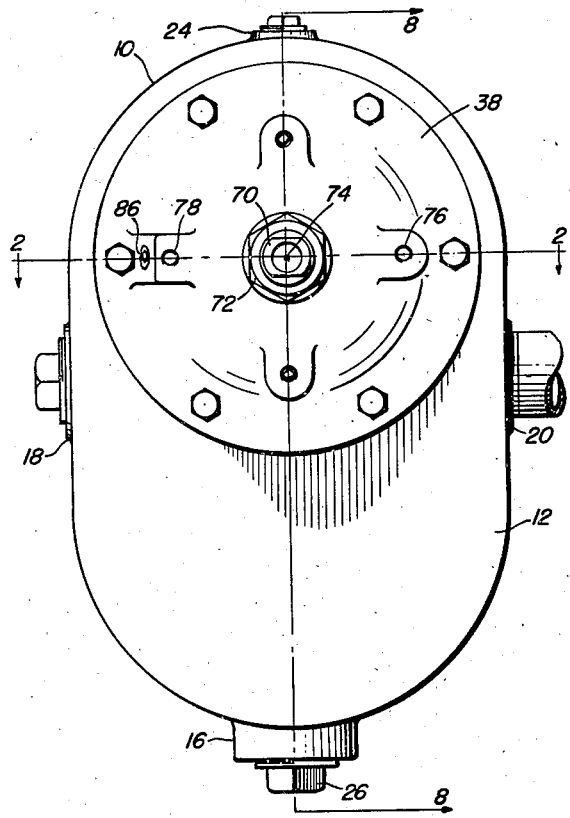
Figure 1 is a front elevation of the improved relay unit.

Referring more particularly to the drawings, and especially to Figures 1 and 2, the novel relay unit 10 has a casing 12 forming a chamber 14 having a bottom outlet opening 16, opposed side outlet openings 18 and 20 and a top outlet opening 24. The fluid whose pressure is to control the action of the system is preferably admitted to the chamber 14 through one or both of the side openings. Any dirt, sediment or other foreign particles in the fluid entering the chamber can settle to the bottom of the casing and when desired can be washed out by removing the plug 26 of the bottom opening and forcing a scavenging fluid into the chamber through the top opening 24.

In the upper portion of the casing, in both the front and back walls, are relatively large openings 28 and 30. One of these is closed by a cover member 32 having at its center a stem 34 extending toward the other large opening. The latter is closed by a diaphragm 36 of rubber or some suitable composition, whose outer edge is clamped between the casing 12 and a second cover member 38 having a semi-spherical portion 38A arranged to form a second chamber 40 outside of the diaphragm. The latter is also clamped between a pair of plates 42 and 44, one of which has a stem 46 projecting through a hole at the center of the diaphragm and through the other plate, on which stem is a washer 48 and nut 50 to clamp the plates and diaphragm together. This stem 46 is in alignment with the stem 34 on the cover member 32 and makes contact therewith to limit the movement of the diaphragm in one direction.

The diaphragm plate 44 has, on the side opposite its stem 46, a series of separated arms 52, 54, to which is secured a disk 56 having a hole 56A at its center. A smaller disk 58, somewhat larger than the hole 56A, is provided on one side of the larger disk 56 and between this second disk 58 and the diaphragm plate 44 is a coiled spring 60 constantly urging the smaller disk against the larger one. The smaller disk at its center is secured to a valve stem 62 which extends through the hole 56A in the larger disk and thence through guide plates 64 and 66 mounted with a spacing sleeve 68 between them within an externally threaded sleeve 70. The latter is screwed into an internally threaded hub 38B on the semi-spherical portion of the cover member 38, being locked thereto by a nut 72. The smaller disk 58 and both guide plates 64 and 66 are provided with holes for a purpose to be presently explained. The outer end of the sleeve 70 has a small orifice 74 opposite the valve stem 62, the latter having a pointed end arranged to enter and close this orifice.

On opposite sides of the cover member 38 are tapped openings 76 and 78. To one of them (78) is connected a pipe 80 leading from a supply of fluid under pressure, and to the other opening (76) is connected a pipe 82 leading to some pressure responsive device 84 located at a distance from the relay unit. Adjacent the opening 78, and connected thereto within the wall of the cover member 38 is another opening 86 the inner end of which has a tapered wall to receive a restriction plug 88 having a smaller orifice 88A. The other end of this opening 86 is closed by a plug 90.

The operation of the relay unit will now be described. Assuming that the fluid, whose pressure is to be the controlling pressure of my system, is present in the large chamber 14 of the casing 12 and acting upon the left side of the diaphragm 36, as seen in Figure 2, the pressure of this fluid will tend to move the diaphragm and its associated movable elements toward the right and, in the absence of a balancing pressure on the other side of the diaphragm, would first cause the needle valve 62 to seat in the orifice 74 and close it. Continued movement of the diaphragm to the right would then cause the disk 56 to seat on the hub 38B of cover member 38, thus limiting the movement of the diaphragm to the right.

Another fluid, however, is being supplied through the pipe 80 from some source of pressure supply and enters the chamber 40 through the restriction 88A and passes on through connection 82 to some closed end in a distant pressure responsive device 84. In due course a pressure will build up in chamber 40 and ultimately become effective to balance the controlling pressure in chamber 14 acting on the diaphragm. As this balance is reached and slightly overcome, the diaphragm and its associated elements will be moved to the left, removing the larger disk 56 from its seat on the hub 38B and bringing it in contact with the smaller disk 58. The latter will then be likewise moved, withdrawing the needle valve 62 from the orifice 74. Opening of this orifice will permit the balancing pressure to escape from chamber 40 and at once begin the reduction of this balancing pressure until the effective pressures acting on both sides of the diaphragm are in balance.

To make this clear, assume the total effective pressure exerted on the diaphragm by the controlling pressure in chamber 14 is two pounds. Let the pressure admitted through the restriction 88A be two pounds and three ounces. This will cause movement of the diaphragm to the left in Figure 2 until the needle valve 62 is withdrawn from the orifice 74 so that the leak of pressure through the latter is equivalent to a loss of three ounces of pressure. Thus the effective pressure in chamber 40 is two pounds and this will exactly balance the effective pressure exerted by the controlling pressure and consequently the diaphragm will be under balanced pressure conditions. The effective pressure of two pounds in the chamber 40 will of course be transmitted by the fluid through connection 82 to the distant pressure responsive device 84. The latter may be a pressure gauge of either the indicating or recording type or a signal device or some other form of actuating mechanism. With the relay unit of Figures 1 and 2 it will be subjected to the same effective pressure (transmitted by the balancing pressure fluid) as that imposed on the diaphragm by the controlling pressure.

If the controlling fluid is a liquid, such as water for example, then under the assumed condition of exerting an effective pressure of only two pounds per square inch it could only support a column of water a little over four and a half feet in height. Thus any device to be responsive directly to this controlling pressure would of necessity have to be placed within this limited height above the diaphragm. With my system, by using a gas such as air for the pressure transmitting fluid, the pressure responsive device could be located at much greater heights above the relay unit, because of the lesser density of gas compared to water. Also with the use of a gas instead of a liquid the distances to which the pressure can be transmitted without lag is greatly increased. Thus the location of the pressure responsive device in my system is not determined by the hydraulic gradient or the viscosity of the controlling liquid but can be placed anywhere within reach of the transmitted gaseous pressure.

In Figure 3 is shown a pressure transmission system in which a plurality of pressures are transmitted to a remote pressure responsive device (not shown). The controlling pressures are those of a liquid flowing through a Venturi tube 92. This, as is well known, is a section in a pipe line so constructed that the normal cross-sectional area is gradually reduced and then gradually restored to normal again. Since the volume of liquid flowing at the normal cross-sectional area must likewise flow through the reduced section, the velocity at the latter section is greater than that in the normal full-size area. If a branch pipe is connected to the main pipe and the static fluid in this branch pipe is imposed upon a pressure gauge, a certain static pressure will be indicated. With the Venturi tube two such pressures are determined, one where the cross-sectional area is full size and the other where the small area exists—that is, at the so-called throat of the tube. By computations based upon these pressures the volume and rate of flow can readily be ascertained.

In applying my improved system to a Venturi tube, one relay unit 10 is connected by pipe 94 to the full-size portion of the tube and another relay unit 10' is connected by pipe 96 to the reduced or smallest section. Thus in one main chamber of one relay unit will be as a controlling pressure, the static pressure corresponding to the full-area pressure of the Venturi tube, and in the main chamber of the other relay unit the controlling pressure will be the static throat pressure of the Venturi tube. Another fluid, preferably air under pressure, will be available in some supply line 98 and after passing a pressure regulator 100 will be admitted to both pressure balancing chambers of the two relay units 10 and 10'. From each balancing chamber separate pipe lines 102 and 104 lead to a distant pressure responsive device, in this instance a device constructed preferably to respond to the differential between the two pressures transmitted to it. By virtue of my improved system this device may be located within reason at any desired elevation and at any desired distance from the venturi and will respond promptly to any changes in the respective controlling pressures occasioned by any change in flow through the Venturi tube. For example, the remote pressure responsive device may be a flow regulator and capable, in response to variation of the transmitted pressures, of effecting a flow control mechanism whereby a desired flow condition through the Venturi tube may be restored. Or the transmitted pressures may operate merely a recording, indicating and/or totalizing instrument.

Figure 4 shows a different flow line 106 in which a baffle plate 108 reduces the area of flow and thus effects a difference in pressure on its opposite sides. The particular baffle plate shown is integral with the flow pipe but it is to be understood as representative of an adjustable baffle of any sort for producing any desired differences in pressure in the flow line. In this Figure 4 the relay units 10" and 10''' are of modified construction in that the cover member 38 and diaphragm are clamped directly to the pipe. This is desirable where it is the practice to frequently remove the unit for purpose of cleaning. For instance, if the flow line were used for conducting milk, after the day's run is over the entire conduit is thoroughly cleaned and it is most convenient to simply remove the cover member and diaphragm from the conduit itself rather than employ the casing 12 and branch connection shown in Figures 1 and 2. The action of each modified unit of Figure 4 is just the same as has been described and the pressures on each side of the baffle can be used as the controlling pressures for effecting the transmission of corresponding pressures to a remote pressure responsive device.

Figure 5:
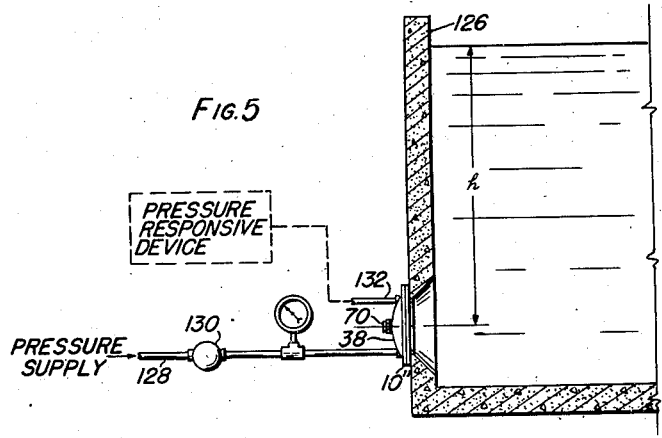
Figure 5 is an elevation partly in section, showing how my system may be employed to indicate the height or level of a liquid in a container.

In Figure 5 I have shown the relay unit employed in a system primarily intended to transmit a pressure corresponding to a head of liquid in a container. In this application of my invention I have shown the modified unit 10" of Figure 4, but it is obvious that the unit of Figures 1 and 2 might just as well be employed. In this case the controlling pressure is that corresponding to the head h of the liquid in the container 126. This will be balanced by pressure of another fluid, preferably air, which enters the unit through the supply pipe 128 and regulator 130. The outlet pipe 132 from the balancing chamber may go to any desired location where a pressure responsive device will indicate the head of liquid in the container 126. Obviously the pressure responsive device may be mechanism responsive to pressure changes to actuate regulating means for causing liquid to flow into the container and thus re-establish a desired head of liquid therein.

A characteristic feature of my improved relay unit for transmitting pressure is that the controlling fluid is entirely sealed off from the pressure transmitting portion of the system. This is of importance where the controlling fluid might be harmful to the ultimate pressure responsive device if admitted directly to it. It is a further feature that the position of the escape valve is determined by the controlling pressure and hence controls the balancing pressure very accurately and promptly. By using a gas such as air as the balancing pressure medium, the pressure transmitting portion of the system can be maintained clean with no danger of clogging or fouling regardless of the nature of the fluid whose pressure is controlling. And by using a gas as the pressure transmitting medium, the ultimate pressure responsive device may be located at any desired position regardless of the hydraulic gradient of the controlling liquid. In cases where ultimately a differential of pressure is to be employed to actuate a pressure responsive device, it is deemed an advantage to transmit the separate pressures to the device and there make use of the differential. Such separate transmission of the two pressures permits of each pressure transmitted being of a higher order than if only the differential alone were to be transmitted and thus insures greater accuracy and a more prompt response of the ultimate actuated device.

I claim:

A pressure transmitting relay unit comprising a casing and a cover member therefor; a chamber containing a controlling pressure; a chamber in said cover member adapted to be connected to a source of fluid under pressure and to a pressure responsive device; a diaphragm between said chambers separating them and subjected on opposite sides to the said respective pressures; a vent in said cover member; and a valve member for said vent; and an operative connection between said valve member and the diaphragm including a spider secured to the diaphragm with provision for the said valve member to extend therethrough and a spring interposed between said diaphragm and the said extended portion of said valve member; the said diaphragm and valve member being so arranged and organized that upon a change occurring in the controlling pressure, said diaphragm is flexed to cause movement of said valve member thereby to control the escape of the fluid pressure through said vent and produce an effective pressure in said cover chamber corresponding to the changed controlling pressure.

JOHN R. HARTLEY.